United States Patent
Kohlrusch

(10) Patent No.: US 8,051,578 B2
(45) Date of Patent: Nov. 8, 2011

(54) REDUCED NOISE DRYER FAN AND IMPELLER AND PRODUCING METHOD THEREOF

(75) Inventor: Frank Kohlrusch, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 442 days.

(21) Appl. No.: 12/308,844

(22) PCT Filed: Jun. 11, 2007

(86) PCT No.: PCT/EP2007/055686
§ 371 (c)(1),
(2), (4) Date: Dec. 22, 2008

(87) PCT Pub. No.: WO2008/000611
PCT Pub. Date: Jan. 3, 2008

(65) Prior Publication Data
US 2009/0241363 A1    Oct. 1, 2009

(30) Foreign Application Priority Data
Jun. 29, 2006 (DE) .......................... 10 2006 029 960

(51) Int. Cl.
*F26B 11/02* (2006.01)
(52) U.S. Cl. ............ 34/381; 34/132; 34/610; 416/241 A; 416/186 R; 264/310
(58) Field of Classification Search ............... 34/381, 34/132, 90, 595, 601, 602, 603, 610; 416/241 A, 416/186 R; 264/310
See application file for complete search history.

(56) References Cited

U.S. PATENT DOCUMENTS

| 2,048,743 A | * | 7/1936 | Huebsch et al. | 34/599 |
|---|---|---|---|---|
| 2,361,297 A | * | 10/1944 | Kutsche | 34/79 |
| 2,440,416 A | * | 4/1948 | Proudfoot | 34/86 |
| 2,498,181 A | * | 2/1950 | Reiter | 366/232 |
| 2,577,104 A | * | 12/1951 | Butler | 34/572 |
| 2,583,850 A | * | 1/1952 | Kauffman | 34/82 |
| 2,600,210 A | * | 6/1952 | Constantine | 34/131 |
| 2,608,769 A | * | 9/1952 | O'Neil | 34/131 |
| 2,623,299 A | * | 12/1952 | Kauffman | 34/82 |
| 2,655,735 A | * | 10/1953 | Traube | 34/604 |
| 2,675,628 A | * | 4/1954 | O'Neil | 34/75 |

(Continued)

FOREIGN PATENT DOCUMENTS

DE    1 173 058    7/1964

(Continued)

OTHER PUBLICATIONS

International Search Report PCT/EP2007/055686.

*Primary Examiner* — Stephen M. Gravini
(74) *Attorney, Agent, or Firm* — James E. Howard; Andre Pallapies

(57) ABSTRACT

A dryer is provided that includes a drum for drying wet laundry via contact of the laundry with process air, an air inlet duct operable to convey process air to the drum, an outlet duct operable to convey process air that has exited the drum, a heating device located in the inlet air duct, and a fan containing an impeller. The fan applies a motive power to process air to effect flow of process air and the impeller has oblique blades.

7 Claims, 4 Drawing Sheets

U.S. PATENT DOCUMENTS

| | | | | |
|---|---|---|---|---|
| 2,677,897 A * | 5/1954 | Herbster | | 34/90 |
| 2,695,460 A * | 11/1954 | Clark | | 34/75 |
| 2,716,820 A * | 9/1955 | Bourner | | 34/82 |
| 2,792,640 A * | 5/1957 | Patterson | | 34/75 |
| 2,796,679 A * | 6/1957 | Dunkelman | | 34/547 |
| 2,814,886 A * | 12/1957 | Fowler | | 34/605 |
| 2,827,276 A * | 3/1958 | Racheter | | 432/62 |
| 2,828,550 A * | 4/1958 | Geldhof | | 34/75 |
| 2,830,385 A * | 4/1958 | Smith | | 34/601 |
| 2,834,121 A * | 5/1958 | Geldhof | | 34/75 |
| 2,843,943 A * | 7/1958 | Geldhof et al. | | 34/75 |
| 2,867,430 A * | 1/1959 | Hullar | | 432/107 |
| 2,871,688 A * | 2/1959 | Geldhof | | 68/19.2 |
| 2,884,710 A * | 5/1959 | Smith | | 34/601 |
| 2,886,901 A * | 5/1959 | Whyte et al. | | 34/601 |
| 2,893,135 A * | 7/1959 | Smith | | 34/610 |
| 2,921,384 A * | 1/1960 | Smith | | 34/75 |
| 2,925,665 A * | 2/1960 | Smith | | 34/82 |
| 2,957,330 A * | 10/1960 | Cline | | 68/20 |
| 2,958,138 A * | 11/1960 | Ashby | | 34/601 |
| 2,958,139 A * | 11/1960 | Smith | | 34/604 |
| 2,959,867 A * | 11/1960 | Doty | | 34/82 |
| 2,975,528 A * | 3/1961 | Shewmon | | 34/601 |
| 2,985,966 A * | 5/1961 | Martin | | 34/75 |
| 2,986,917 A * | 6/1961 | Smith | | 68/20 |
| 3,001,295 A * | 9/1961 | Miller | | 34/82 |
| 3,022,580 A * | 2/1962 | Doty | | 34/60 |
| 3,022,581 A * | 2/1962 | Smith | | 34/75 |
| 3,023,514 A * | 3/1962 | Gibson | | 34/589 |
| 3,027,653 A * | 4/1962 | Long et al. | | 34/86 |
| 3,032,887 A * | 5/1962 | Whyte et al. | | 34/524 |
| 3,034,221 A * | 5/1962 | Tuck et al. | | 34/527 |
| 3,034,226 A * | 5/1962 | Conlee | | 34/596 |
| 3,040,440 A * | 6/1962 | Mellinger et al. | | 34/75 |
| 3,050,974 A * | 8/1962 | Smith | | 68/20 |
| 3,060,593 A * | 10/1962 | Flora et al. | | 34/601 |
| 3,081,555 A * | 3/1963 | Stratman | | 34/79 |
| 3,087,351 A * | 4/1963 | Ross | | 74/368 |
| 3,091,955 A * | 6/1963 | Taylor et al. | | 68/19.2 |
| 3,116,984 A * | 1/1964 | Decatur | | 34/79 |
| 3,121,000 A * | 2/1964 | Hubbard | | 34/75 |
| 3,139,633 A * | 7/1964 | Fecho et al. | | 8/158 |
| 3,167,409 A * | 1/1965 | Brucken | | 34/601 |
| 3,169,838 A * | 2/1965 | Kripke | | 34/528 |
| 3,170,774 A * | 2/1965 | Deaton | | 34/527 |
| 3,197,884 A * | 8/1965 | Smith | | 34/532 |
| 3,197,885 A * | 8/1965 | Smith | | 34/527 |
| 3,200,511 A * | 8/1965 | Smith | | 34/529 |
| 3,220,120 A * | 11/1965 | Ross | | 34/601 |
| 3,221,417 A * | 12/1965 | Mellinger | | 34/528 |
| 3,239,945 A * | 3/1966 | Cobb et al. | | 34/527 |
| 3,243,891 A * | 4/1966 | Smith | | 34/528 |
| 3,253,347 A * | 5/1966 | Kripke | | 34/546 |
| 3,263,343 A * | 8/1966 | Loos | | 34/82 |
| 3,270,431 A * | 9/1966 | Schwartz | | 34/549 |
| 3,277,583 A * | 10/1966 | Reinhold | | 34/58 |
| 3,286,361 A * | 11/1966 | Cobb et al. | | 34/445 |
| 3,287,817 A * | 11/1966 | Smith | | 34/446 |
| 3,289,317 A * | 12/1966 | Lough et al. | | 34/604 |
| 3,290,793 A * | 12/1966 | Jacobs et al. | | 34/76 |
| 3,301,024 A * | 1/1967 | Smith | | 68/12.15 |
| 3,333,345 A * | 8/1967 | Miller | | 34/528 |
| 3,333,346 A * | 8/1967 | Brucken | | 34/131 |
| 3,346,115 A * | 10/1967 | Mellinger | | 34/319 |
| 3,398,465 A * | 8/1968 | Miller et al. | | 34/599 |
| 3,471,940 A * | 10/1969 | Smith | | 34/603 |
| 3,504,444 A * | 4/1970 | Laue et al. | | 34/131 |
| 3,508,340 A * | 4/1970 | Kombol | | 34/553 |
| 3,514,867 A * | 6/1970 | Patrick | | 34/527 |
| 3,545,096 A * | 12/1970 | Robandt et al. | | 34/547 |
| 3,584,393 A * | 6/1971 | Menk | | 34/562 |
| 3,599,342 A * | 8/1971 | Cotton | | 34/393 |
| 3,613,253 A * | 10/1971 | Smith | | 34/532 |
| 3,613,254 A * | 10/1971 | Smith | | 34/527 |
| 3,647,196 A * | 3/1972 | Cotton | | 432/37 |
| 3,651,579 A * | 3/1972 | Smith | | 34/532 |
| 3,710,138 A * | 1/1973 | Cotton | | 307/118 |
| 3,733,712 A * | 5/1973 | Smith | | 34/532 |
| 3,782,001 A * | 1/1974 | Cotton | | 34/532 |
| 3,789,514 A * | 2/1974 | Faust et al. | | 34/82 |
| 3,824,476 A * | 7/1974 | Cotton | | 327/509 |
| 3,831,292 A * | 8/1974 | DePas | | 34/75 |
| 3,858,330 A * | 1/1975 | De Pas | | 34/75 |
| 3,859,004 A * | 1/1975 | Condit | | 34/75 |
| 3,875,268 A * | 4/1975 | DePass | | 261/88 |
| 3,875,679 A * | 4/1975 | Condit | | 34/75 |
| 3,875,681 A * | 4/1975 | De Pas | | 34/75 |
| 3,915,596 A * | 10/1975 | Frazar | | 417/423.1 |
| 3,940,861 A * | 3/1976 | Frazar | | 34/75 |
| 4,174,020 A | 11/1979 | Challis | | |
| 4,204,339 A * | 5/1980 | Muller | | 34/75 |
| 4,207,686 A * | 6/1980 | Daily | | 34/610 |
| 4,360,977 A | 11/1982 | Frohbieter | | |
| 4,407,077 A * | 10/1983 | Smith | | 34/108 |
| 4,640,022 A * | 2/1987 | Suzuki et al. | | 34/552 |
| 4,702,018 A * | 10/1987 | Hastings | | 34/130 |
| 4,817,297 A * | 4/1989 | Toma et al. | | 34/595 |
| 5,074,131 A * | 12/1991 | Hirose et al. | | 68/19.2 |
| 5,097,606 A * | 3/1992 | Harmelink et al. | | 34/467 |
| 5,228,212 A * | 7/1993 | Turetta et al. | | 34/493 |
| 5,546,678 A * | 8/1996 | Dhaemers | | 34/275 |
| 5,713,139 A * | 2/1998 | Briggs | | 34/602 |
| 5,819,437 A * | 10/1998 | Briggs | | 34/604 |
| 5,915,922 A | 6/1999 | Wiethe et al. | | |
| 7,594,343 B2 * | 9/2009 | Woerdehoff et al. | | 34/491 |
| 7,913,418 B2 * | 3/2011 | Carow et al. | | 34/499 |
| 2003/0079368 A1 * | 5/2003 | Hoffman | | 34/202 |
| 2003/0152679 A1 * | 8/2003 | Garwood | | 426/392 |
| 2004/0045187 A1 * | 3/2004 | Curry et al. | | 34/595 |
| 2006/0150439 A1 * | 7/2006 | Latack et al. | | 34/601 |
| 2006/0288605 A1 * | 12/2006 | Carow et al. | | 34/446 |
| 2006/0288608 A1 * | 12/2006 | Carow et al. | | 34/604 |
| 2007/0062061 A1 * | 3/2007 | Carow | | 34/443 |
| 2007/0186438 A1 * | 8/2007 | Woerdehoff et al. | | 34/486 |
| 2008/0034611 A1 * | 2/2008 | Carow et al. | | 34/565 |
| 2008/0141555 A1 * | 6/2008 | Hoogendoorn et al. | | 34/235 |
| 2008/0168675 A1 * | 7/2008 | Garman et al. | | 34/195 |
| 2009/0038175 A1 * | 2/2009 | Ziemann | | 34/218 |
| 2009/0071031 A1 * | 3/2009 | Kim | | 34/140 |
| 2009/0113745 A1 * | 5/2009 | Choi et al. | | 34/139 |
| 2009/0151192 A1 * | 6/2009 | Nawrot | | 34/526 |
| 2009/0193678 A1 * | 8/2009 | Latack et al. | | 34/139 |
| 2009/0229141 A1 * | 9/2009 | Nawrot et al. | | 34/467 |
| 2009/0241363 A1 * | 10/2009 | Kohlrusch | | 34/132 |
| 2009/0272003 A1 * | 11/2009 | Dalton et al. | | 34/329 |
| 2009/0272004 A1 * | 11/2009 | Chernetski et al. | | 34/389 |
| 2010/0000118 A1 * | 1/2010 | Cunningham | | 34/487 |
| 2010/0024243 A1 * | 2/2010 | Ricklefs et al. | | 34/474 |
| 2010/0281707 A1 * | 11/2010 | Nawrot et al. | | 34/134 |
| 2010/0293804 A1 * | 11/2010 | Nawrot et al. | | 34/86 |
| 2011/0030238 A1 * | 2/2011 | Nawrot et al. | | 34/499 |

FOREIGN PATENT DOCUMENTS

| | | | |
|---|---|---|---|
| DE | 100 49 341 | | 4/2002 |
| DE | 102006029960 A1 * | | 1/2008 |
| EP | 1854570 A1 * | | 11/2007 |
| EP | 2103730 A1 * | | 9/2009 |
| GB | 1 416 882 | | 12/1975 |
| GB | 2 219 849 | | 12/1989 |
| GB | 2 319 669 | | 5/1998 |
| JP | 58035297 A * | | 3/1983 |
| JP | 59183293 A * | | 10/1984 |
| JP | 60238693 A * | | 11/1985 |
| JP | 60238695 A * | | 11/1985 |
| JP | 60238696 A * | | 11/1985 |
| JP | 03133498 A * | | 6/1991 |
| JP | 03244498 A * | | 10/1991 |
| JP | 04009196 A * | | 1/1992 |
| WO | WO 2008000611 A1 * | | 1/2008 |

* cited by examiner

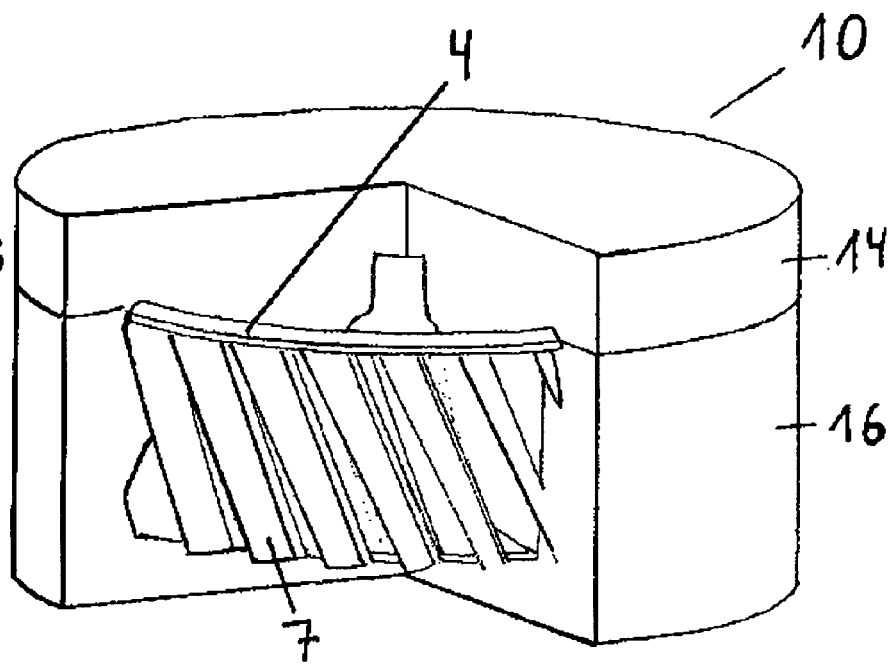
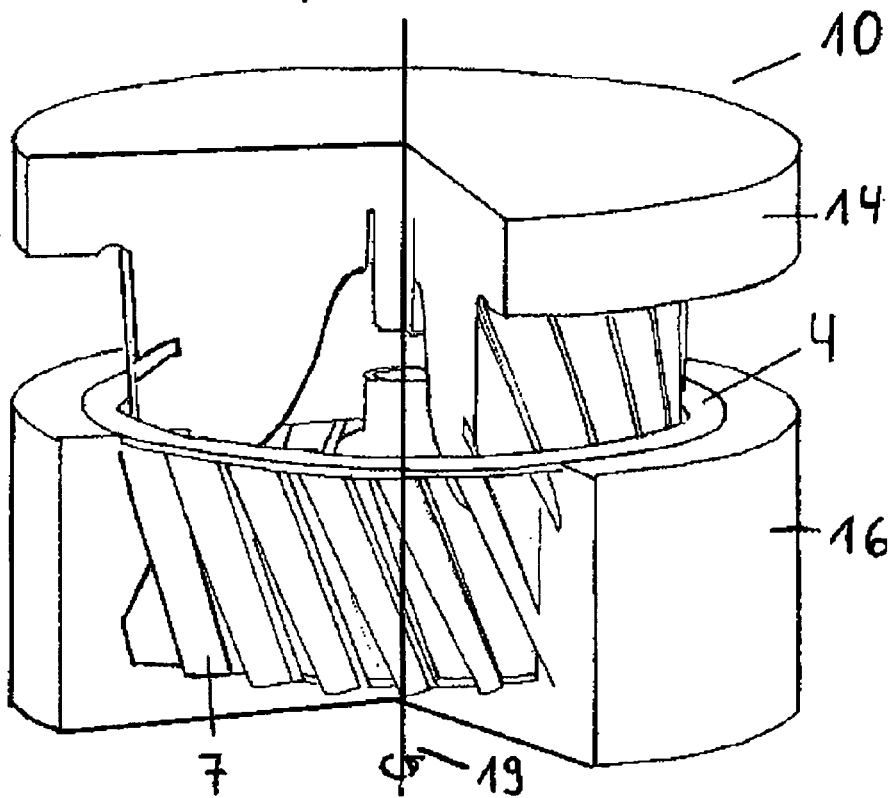

REDUCED NOISE DRYER FAN AND IMPELLER AND PRODUCING METHOD THEREOF

BACKGROUND OF THE INVENTION

The invention relates to a dryer with reduced noise development, a fan and an impeller suitable therefor and also to a method for producing the impeller. The invention relates in particular to a fan with a specially shaped impeller as well as to a dryer containing this fan and to the impeller contained in this dryer or fan.

In dryers, especially tumble dryers, laundry contained in a drum that is normally rotating is dried by having a heated stream of air directed through the drum and thereby through the laundry, with said stream of air being capable of extracting moisture from the wet laundry, gradually drying the laundry in the process.

The stream of air supplied ("process air flow") is heated up in a feed line before the drum ("laundry drum") by means of a heating device and after passing through the laundry in the drum is either directed to the outside (vented-air tumble dryer) or fed to a heat exchanger in which the air is cooled and the moisture is precipitated from it as condensate. A fan which features an impeller (also called a "drum impeller" or "radial fan wheel") is generally used to propel the air. The noise generated during operation of a dryer is a disadvantage and the fan propelling the process air in particular contributes to said noise.

EP 0 702 105 B1 describes a housing for a fan in a domestic appliance, especially in a domestic tumble dryer which makes it possible to reduce the noise arising and to damp down noise which has arisen. The housing features a radial fan wheel which is installed so that it can rotate within a spiral casing and to which the air is fed axially, with the spiral casing being separably surrounded by a casing wall with wall shape which is matched to the spiral contour and extends at a distance from it, of a shell, and means are provided for maintaining the distance.

BRIEF SUMMARY OF THE INVENTION

The object of the present invention was thus to provide a dryer and fan suitable therefore which make possible a further reduction in the noise development.

This object is achieved by the dryer, fan or impeller described herein. The invention also relates to a method for producing the impeller.

The inventive dryer thus has a drum for drying moist laundry by means of process air, a heating device in an inlet air duct before the drum and an outlet duct beyond the drum as well as a fan containing an impeller, with the impeller having oblique blades.

An "oblique blade" in the sense of the disclosure means that the vanes of the impeller (also called the "fan wheel") form an angle which is other than 90° to the circumference of the impeller. This means that the edge of a fan blade does not lie in parallel to the axis of rotation of the impeller when the fan is in operation.

The inventive dryer can advantageously be both a condensing dryer and also a vented-air dryer.

The inventive dryer and the inventive fan can contain sound deadening components, as are described in EP 0 702 105 B1 for example. In addition the further sound deadening measures likewise described in EP 0 702 105 B1 can be taken. Examples of this are making the spiral casing of the fan double walled as well as minimizing the number of noise bridges, perforation of the spiral jacket as well as filling up of spaces with sound-deadening material.

The invention also relates to a fan suitable for use in this dryer. The fan has an impeller with oblique blades, with the impeller being made of plastic.

The inventive fan is suitable for all domestic appliances in which fans are used, for example air conditioning systems, hair dryers, ventilators and dryers.

The invention also relates to an impeller especially suited to the aforementioned fan. The inventive impeller with oblique blades is made of plastic and has a shape which, during production by injection molding in a two-part mold which comprises a first mold part and a second mold part which in the closed state of the two-part mold part form a cavity in the shape of the impeller, makes it possible to remove the impeller from the mold by opening the mold part as a result of superimposing a translatory movement and a rotational movement between the first mold part and the second mold part.

In the inventive impeller the number of blades can vary over a wide range. In addition the blades forming the oblique blade configuration can have different shapes. In general the vanes are not flat. Preferably the vanes are embodied convex or concave.

The impeller or radial fan wheel is mounted to allow rotation in the fan generally in a spiral casing with the air being fed axially to the impeller.

It has surprisingly been found that an impeller with oblique blades leads to a significant noise reduction compared to an impeller with straight blades which is otherwise identical. This relates especially to small gaps between the blades of the impeller and the tongue of the fan housing, since in this case sound is able to be heard and measured especially easily. The implementation of small spaces between tongue and blades or impeller is however, because of the generally restricted space in fans, which are to be as small as possible, a significant means for increasing the power of a cross flow fan.

The invention also relates to a method for producing the inventive impeller with oblique blades. In this method in a two-part mold, comprising a first mold part and a second mold part is used which, when the two-part mold is closed, forms a cavity in the shape of the impeller, (a) A material which can form a hard plastic in the shape of the impeller is brought between the first mold part and the second mold part, with the first mold part and the second mold part being selected so that a removal from the mold of the impeller through the opening of the mold part is possible as a result of superimposing a translatory movement and a rotational movement between the first mold part and the second mold part, (b) The impeller is formed from the material, and (c) The formed impeller is removed from the mold by opening of the mold part as a result of overlaying a translatory movement and a rotational movement between the first mold part and the second mold part.

In a preferred embodiment of the inventive method the material which can form a hard plastic in the shape of the impeller is a thermoplastic polymer material available as a melt.

In another preferred embodiment of the inventive method the material which can form a hard plastic in the shape of the impeller is a reactive mixture of monomers which, at the conclusion of a polymerization reaction, can form a hard polymer material.

The invention has numerous advantages. In an inventive fan with an oblique impeller ("impeller with oblique blades") compared to the case of an impeller with straight blades, an impeller with a greater diameter can be used without the noise level increasing. Thus a higher power output of the fan can be realized without any increase in noise.

Compared to using an impeller with the same diameter and the same number of blades, but with straight blades, the use of an inventive impeller with oblique blades allows a significant noise reduction to be achieved while the power of the fan remains the same.

The invention can be used not just for domestic appliances; instead it is able to be transferred to all other comparable applications of fans.

BRIEF DESCRIPTION OF THE DRAWINGS

Further details of the invention emerge from the subsequent description of non-restrictive embodiments. The reader is referred in this regard to FIGS. 1 to 7.

FIG. 6 shows an impeller in a closed two-part mold of an injection molding device not shown in any greater detail, with a part cut out of the mold to reveal the impeller.

FIG. 7 illustrates with reference to the opening of the mold shown in FIG. 6 the principle of removing the impeller from the mold during production by injection molding.

DETAILED DESCRIPTION OF THE PRESENT INVENTION

Figure 1:
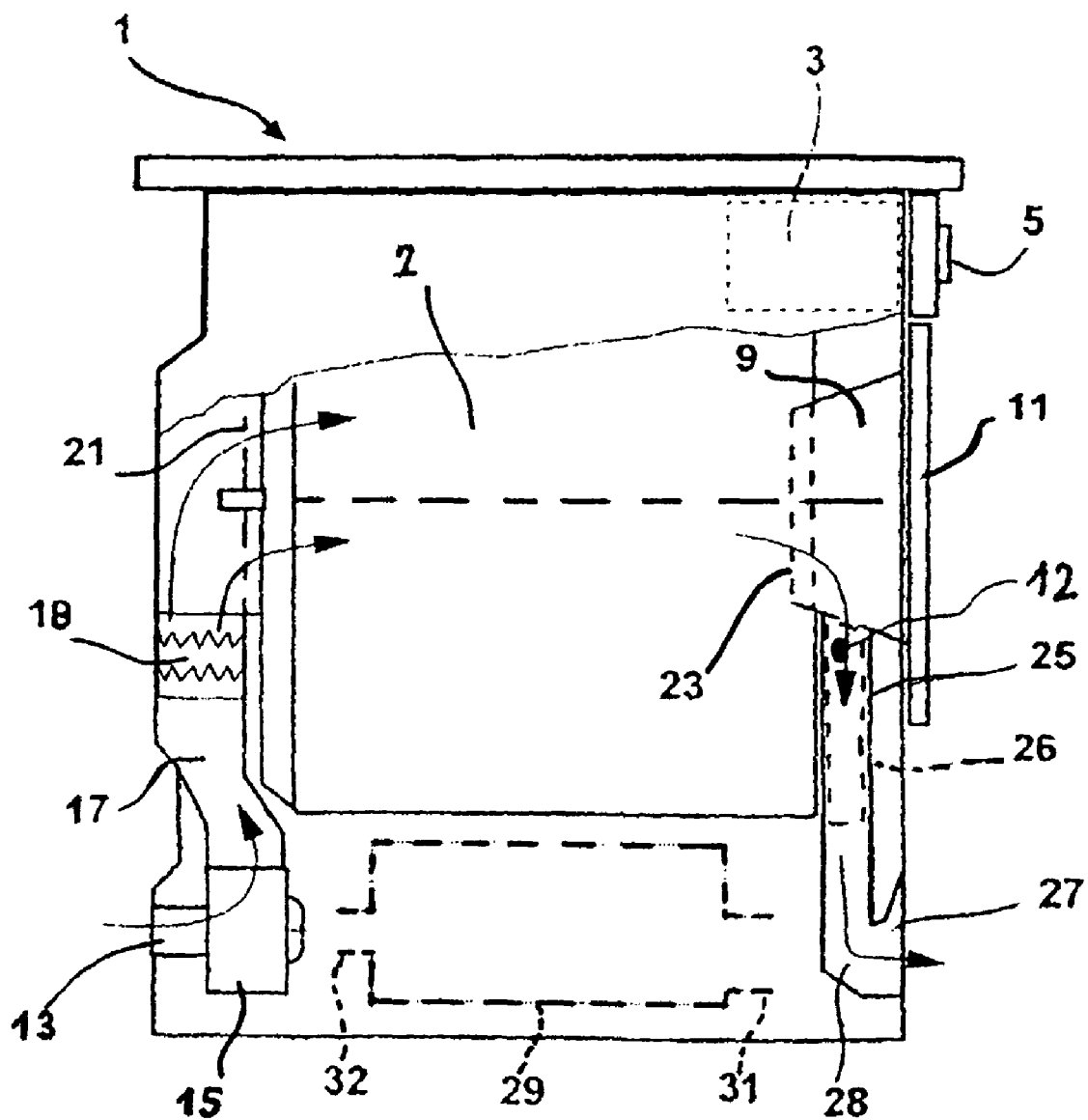
FIG. 1 shows a cross section of part of a dryer which depicts both the vented-air dryer type (solid lines) and also the condenser dryer with recirculation principle type (dashed lines).

FIG. 1 shows sectional view of part of a dryer 1. In its upper part this has a program control device 3 which is able to be adjusted by an operating knob 5 and can preferably contain a fuzzy processor control not shown here.

The dryer 1 features a drum 2 which is accessible via a port seal 9 from a loading door 11 and via which the laundry can be placed in the drum 2 and removed from it again.

Arranged on the lower rear side of the dryer 1 is a process air opening 13, which sucks in air from outside via a fan 15 and lets it flow into a process air duct 17. In this dryer the inside of the fan 15 which is not visible in any greater detail in this diagram has an impeller with oblique blades.

The fresh process air flows from the process air duct 17 via a heating device 18 onwards to the entry 21 of the drum 2. The process air flows across the drum 2 and at output 23 flows out through an outlet duct 25. Arranged behind drum 2 in the 22 outlet duct 25 is a temperature sensor 12, which at predetermined time intervals periodically detects the temperature of the process air and supplies the measured value to a corresponding control device (not shown).

There is also a lint filter 26 in the outlet duct 25. The process air flows through the outlet duct 25 to an outlet opening 27 and then into the open air. The dryer 1 of this embodiment thus operates in accordance with the vented-air principle.

The process air circuit can also be closed to form a recirculating air tumble dryer, with the exhaust air being fed from the outlet duct 25 to a condenser 29. The condenser 29 is embodied as a heat exchanger, in which the moist exhaust air is cooled down and the increased air humidity correspondingly condensed. This air is then moved onwards by the fan 15 into the process air duct 17. The condensate can, in a manner not shown in FIG. 1, be discharged at a suitable location from the dryer 1 or pumped into a condensate container, from which it can be removed manually.

To form a condensation tumble dryer operating in recirculation mode the angled pieces 28 of the exhaust air duct 25 and the fan 15 are turned around and connected to the respective flanges 31 or 32 of the condenser 29.

Figure 2:
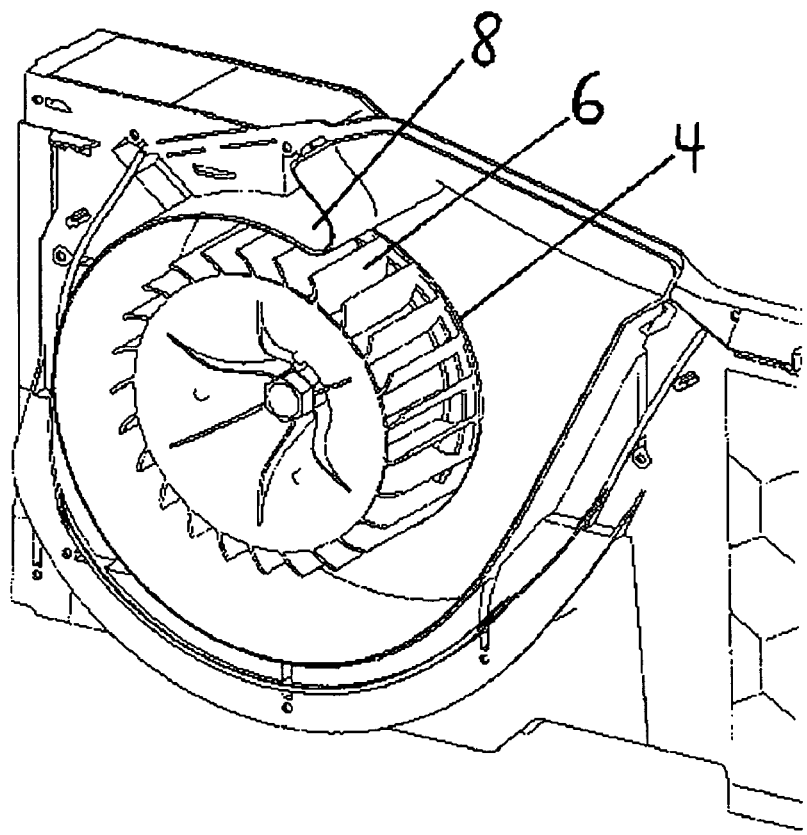
FIG. 2 shows a conventional fan, as used in a conventional dryer, with an impeller with straight blades.
Figure 3:
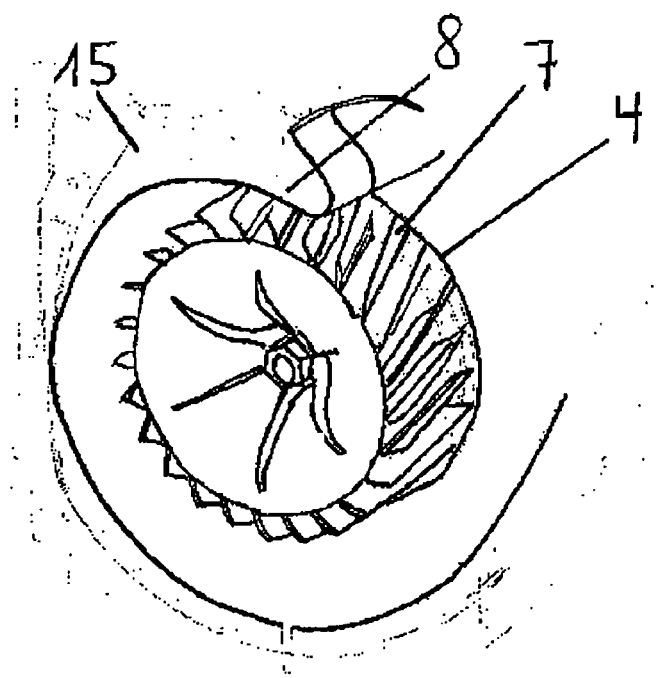
FIG. 3 shows a fan containing an impeller with oblique blades.

FIG. 2 shows an opened fan, in which the impeller 4 has blades 6 arranged in a straight configuration. 8 means the tongue of the fan. The distance between tongue 8 and impeller 4 defines the generation of noise in operation of the fan. FIG. 3 shows a fan 15 which has an impeller 4 with blades in an oblique configuration.

Figure 4:
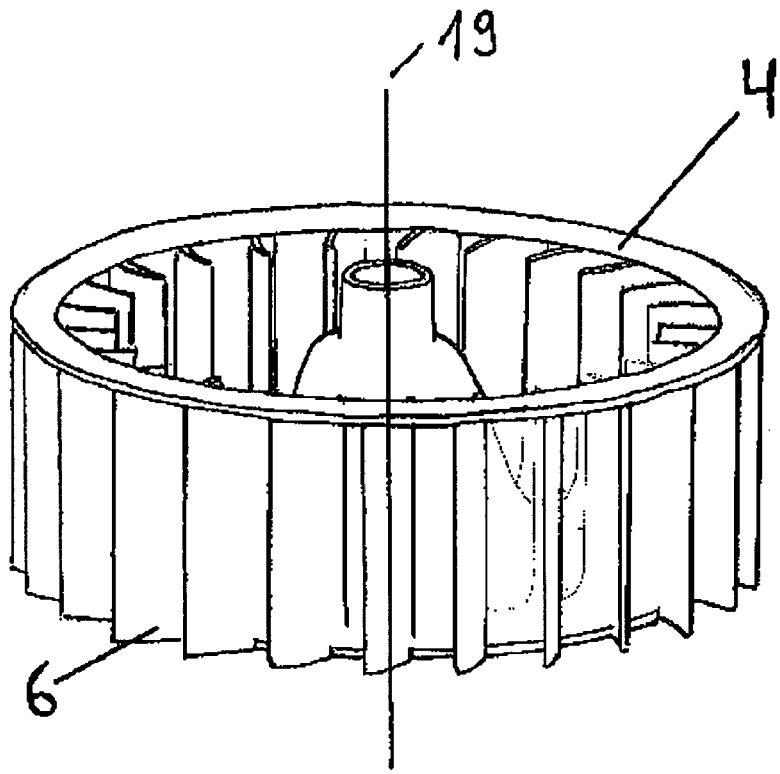
FIG. 4 shows an impeller with straight blades.

FIG. 4 shows an impeller with straight blades. The number 19 indicates the axis of rotation around which the impeller 4 rotates when the fan is operating. With this impeller 4 the edge of a conventional fan wheel 6 is parallel to the axis of rotation 19.

Figure 5:
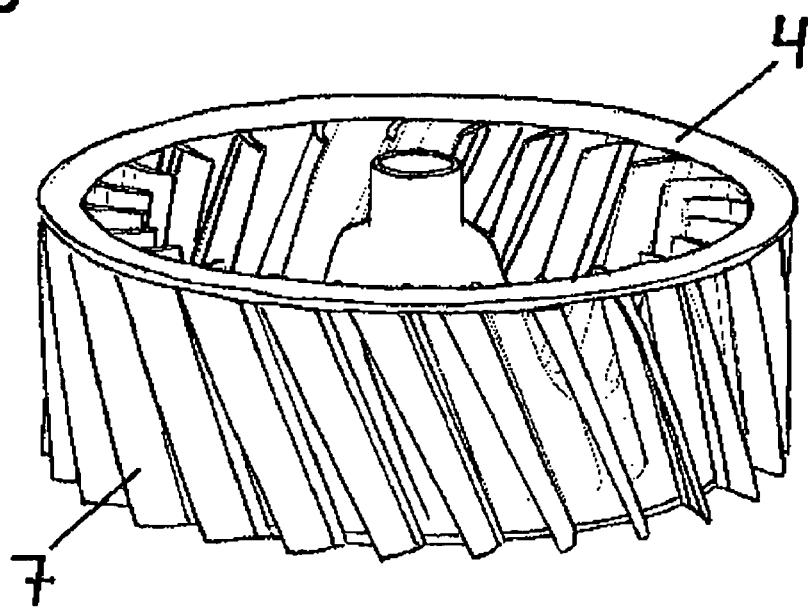
FIG. 5 shows an impeller with oblique blades.

FIG. 5 shows an impeller 4 with oblique blades 7 (obliquely arranged impeller blades 7), which is otherwise identical to the impeller of FIG. 4.

FIG. 6 and FIG. 7 illustrate production of an impeller 4 with oblique blades 7 using an injection molding method.

FIG. 6 shows an impeller 4 in a closed two-part mold 10 of an injection molding device not shown in any greater detail, with a part cut out of the mold to reveal the impeller 4. The two-part mold 10 consists of a first mold part 14 and a second mold part 16.

FIG. 7 illustrates, with reference to the opening of the mold 20 shown in FIG. 6, the principle of removing the impeller 4 from the mold during its production by injection molding. Unlike the diagram of the mold 20 depicted in FIG. 6, in FIG. 7 the first mold part 14 and the second mold part 16 are separated from each other. FIG. 7 illustrates this separation as a result of superimposing a translatory movement of the two mold parts (14, 16) from each other as well as a rotational movement of the two mold parts (14, 16) relative to each other around the axis of rotation 19.

The invention claimed is:

1. A dryer comprising:
   a drum for drying wet laundry via contact of the laundry with process air;
   an air inlet duct operable to convey process air to the drum;
   an outlet duct operable to convey process air that has exited the drum;
   a heating device located in the inlet air duct; and
   a fan containing an impeller rotatable about an axis of rotation, to apply a motive power to process air to effect flow of process air, wherein the impeller includes a plurality of blades forming an angle of other than 90° relative to a circumference of the impeller, the blades not being parallel to the axis of rotation of the impeller.

2. The dry as claimed in claim 1, wherein
   an impeller with a plurality of blades mounted to a circumference of the impeller, the blades forming an angle of other than 90° relative to a circumference of the impeller, the blades not being parallel to the axis of rotation of the impeller, the impeller comprising a plastic material.

3. A method for producing an impeller with oblique blades, the method comprising:
   forming a cavity in a shape of the impeller in a closed state of a two-part mold that includes a first mold part and a second mold part;
   disposing a material that can form a hard plastic in the shape of the impeller between the first mold part and the second mold part, with the first mold part and the second mold part being selected so that it is possible to remove the impeller from the mold by opening the mold as a result of superimposing a translatory movement along a rotational axis of the impeller onto a rotational movement between the first mold part and the second mold part;

forming an impeller from the material; and removing the molded impeller from the mold via opening up the mold as a result of superimposing a translatory movement along a rotational axis of the impeller onto a rotational movement between the first mold part and the second mold part.

4. The method as claimed in claim 3, wherein the material which can form a hard plastic in the shape of the impeller is a thermoplastic polymer material present in the melt.

5. The method as claimed in claim 3, wherein the material which can form the hard plastic in the shape of the impeller is a reactive mixture of monomers that can form a hard polymer material at the conclusion of a polymer reaction.

6. The dryer as claimed in claim 1, wherein each of the blades has a convex or concave shape in cross-section.

7. The dryer as claimed in claim 2, wherein each of the blades has a convex or concave shape in cross-section.

* * * * *